United States Patent [19]

Nogami

[11] 4,175,791
[45] Nov. 27, 1979

[54] HYDRAULIC BRAKE PRESSURE CONTROL APPARATUS FOR MOTOR VEHICLES

[75] Inventor: Tomoyuki Nogami, Toyota, Japan

[73] Assignee: Toyota Jidosha Kogyo Kabushiki Kaisha, Toyota, Japan

[21] Appl. No.: 887,739

[22] Filed: Mar. 17, 1978

[30] Foreign Application Priority Data

Apr. 15, 1977 [JP] Japan .............................. 52-47622[U]

[51] Int. Cl.² .............................................. B60T 8/14
[52] U.S. Cl. ................................... 303/24 A; 60/574; 60/591; 303/24 C; 303/24 F
[58] Field of Search ................. 303/24 F, 24 A, 24 C, 303/24 R, 6 C, 24 B, 24 BB; 188/349; 60/574, 591

[56] References Cited

U.S. PATENT DOCUMENTS

| | | | |
|---|---|---|---|
| 3,252,740 | 5/1966 | Stelzer | 303/24 F |
| 3,476,443 | 11/1969 | Bratten | 303/6 C |
| 4,077,673 | 3/1978 | Takeshita | 303/6 C |

Primary Examiner—Trygve M. Blix
Assistant Examiner—Reinhard J. Eisenzopf
Attorney, Agent, or Firm—Cushman, Darby & Cushman

[57] ABSTRACT

An apparatus for controlling hydraulic pressure delivered to brake cylinders for rear wheels of a motor vehicle in dependence on load states and deceleration thereof comprises a first hydraulic chamber communicated with a master brake cylinder operable by a brake pedal, a second hydraulic chamber communicated with the brake cylinders for the rear wheels, a communication passage for communicating the first and second hydraulic chambers with each other, a ball valve disposed in the first hydraulic chamber and adapted to be displaced under inertia to close the communication passage, and a differential piston having pressure receiving regions exposed in the first and second hydraulic chambers for controlling the rate of increase in the hydraulic pressure within the brake cylinders for the rear wheels relative to the increase in the hydraulic pressure within the master cylinder. The differential piston is disposed in series with the ball valve and adapted to be displaced in the direction toward the first hydraulic chamber to bear against the ball valve thereby to prevent the latter from closing the communication passage in dependence on load states of the motor vehicle.

6 Claims, 4 Drawing Figures

HYDRAULIC BRAKE PRESSURE CONTROL APPARATUS FOR MOTOR VEHICLES

The present invention relates in general to a hydraulic brake pressure control apparatus for motor vehicles and in particular to an apparatus for controlling hydraulic pressure delivered to hydraulic brake cylinders for rear wheels of a motor vehicle in dependence on load states and deceleration thereof.

As is known in the art, in order to prevent a skid of wheels of a motor vehicle upon braking thereof, the braking force applied to the rear wheel must be appropriately controlled relative to the braking force applied to the front wheels. To this end, a hydraulic brake pressure control apparatus is installed in a hydraulic conduit which communicates a master brake cylinder operable by a brake pedal with brake cylinders for the rear wheels, whereby the hydraulic brake pressure delivered to the brake cylinders for the rear wheels is controlled in a proper ratio relative to the hydraulic pressure in the master cylinder. In this case, the hydraulic brake medium or oil is directly supplied to the front wheel brake cylinders from the master cylinder.

A hitherto known structure of such hydraulic brake pressure control apparatus comprises a first hydraulic chamber communicated with the master brake cylinder and a second hydraulic chamber communicated with the brake cylinders for the rear wheels. The first and second hydraulic chambers are communicated with each other through a communication passage which is adapted to be closed by a ball valve under inertia when the deceleration of the vehicle has attained a predetermined level. Further, a differential piston having pressure receiving regions exposed in the first and second hydraulic chambers is provided to control the rate of increase in the hydraulic pressure within the brake cylinders for the rear wheels relative to the increase in the hydraulic pressure within the master cylinder. The hydraulic brake pressure control apparatus of such structure has a drawback that the control apparatus is not suited for use in a motor vehicle which undergoes a large variation in the total weight thereof in dependence on the load states inclusive of unloaded and fully loaded states. For example, when the control apparatus of the construction described above is used for such motor vehicle subject to a large variation in respect of the total weight thereof and the control performance characteristic of the control apparatus is established for the unloaded state of the vehicle, then the hydraulic pressure in the brake cylinders for the rear wheels will become inappropriately lowered in the full-load state of the motor vehicle, since the hydraulic pressure delivery to the second chamber and hence to the brake cylinders for the rear wheels is interrupted by the inertia ball valve which is displaced to lose the communication passage to the second hydraulic chamber in the same manner as in the case of the unloaded state of the motor vehicle.

An object of the invention is to provide an improved hydraulic brake pressure control apparatus which is immune to the disadvantages of the hitherto known apparatus.

Another object of the invention is to provide a hydraulic brake pressure control apparatus which is capable of controlling the hydraulic pressure delivered to the brake cylinders for the rear wheels in an appropriate manner in dependence on various load states of the vehicle and thus can be employed in a motor vehicle which experiences large variations in respect of the total weight.

Briefly, according to the teachings of the invention, the ball valve and the differential piston are disposed in series to each other so that the end of the differential piston located in the first hydraulic chamber will abut on the ball valve after a predetermined displacement of the differential piston in the direction toward the first hydraulic chamber thereby to prevent the communication passage to the second chamber from being closed by the valve member when the vehicle is in the full-load state.

Above and other objects, features and advantage of the invention will become more apparent from the description of preferred embodiments of the invention made in conjunction with the accompanying drawings, in which.

Figure 1:
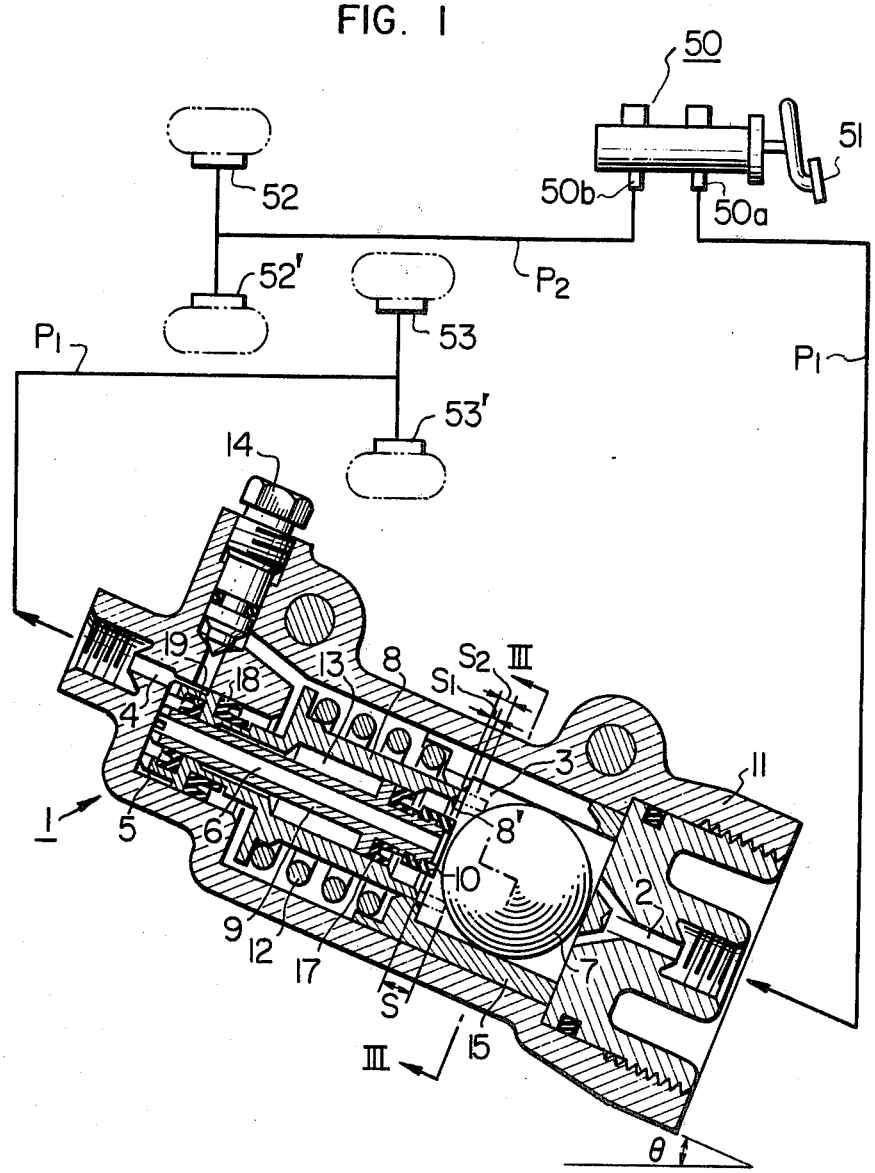
FIG. 1 is a vertical sectional view showing an hydraulic brake pressure control apparatus in accordance with an embodiment of the invention together with schematic illustration of a hydraulic brake system of a motor vehicle.
Figure 4:
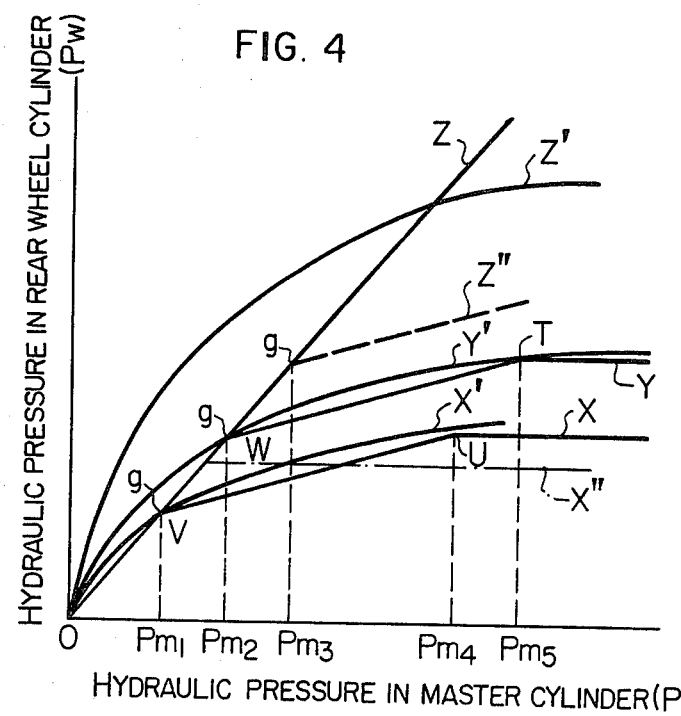

FIG. 4 graphically illustrates the control performance characteristics of the control apparatus shown in FIG. 1 in comparison with ideal control characteristics.

Referring to FIG. 1, a hydraulic brake pressure control apparatus 1 for a motor vehicle according to a preferred embodiment of the invention is installed in a hydraulic line or circuit $P_1$ which connects hydraulically a tandem type master brake cylinder 50 at an exit or outlet port 50a to hydraulic brake cylinders 53 and 53' for rear wheels of the motor vehicle. The master cylinder 50 further has another exit or outlet port 50b connected directly to hydraulic cylinders 52 and 52' for the front wheels through a hydraulic line or conduit $P_2$. In this connection, it should be mentioned that the hydraulic brake pressure control apparatus 1 is disposed with such orientation reltive to the motor vehicle that the downstream side of the control apparatus (the left-hand side as viewed in FIG. 1) is positioned at the front side of the motor vehicle, while the upstream side (or the right-hand side) of the control apparatus 1 as viewed in FIG. 1 is inclined upwardly with a preselected angle $\theta$ relative to horizontal axis of the motor vehicle. In FIG. 1, reference numeral 51 denotes a brake pedal for actuating the master cylinder 50.

The hydraulic brake pressure control apparatus 1 comprises an upstream or first hydraulic chamber 3 communicated with the master cylinder 50 through an inlet passage 2 for brake medium or oil and a downstream or second hydraulic chamber 5 communicated with the brake cylinders 53 and 53' for the rear wheels through an outlet passage 4. A spherical ball valve 7 is accommodated within the upstream chamber 3. There are disposed in series with the ball valve 7 a differential piston 8 which has a stationary sleeve-like member 9 fitted therein. The differential piston 8 has a first pressure receiving region A exposed in the upstream chamber 3 and a second pressure receiving region B exposed in the downstream chamber 5 (refer to FIG. 2) and is adapted to be slidably displaced in the axial direction along the sleeve-like member 9. The differential piston 8 is further so dimensioned that, upon attaining the position indicated by the broken lines in FIG. 1 after having been displaced toward the upstream side for a predetermined distance S, the upstream side end 8' of the differential piston 8 will abut on the ball valve 7. The stationary sleeve-like member 9 has a center bore 6 formed therethrough and serving as a communication passage for communicating the upstream and downstream chambers 3 and 5 with each other. The upstream side end of the stationary sleeve-like member 9 is provided with a valve seat 10 for the ball valve 7. In FIG. 1, reference numeral 11 denotes a housing of the hydraulic brake pressure control apparatus 1, numeral 12 denotes a spring for resiliently urging the differential piston 8 toward the downstream side, and numeral 14 designates a deaeration plug.

As will be readily appreciated, when the differential piston 8 is applied with a hydraulic pressure in the upstream or first hydraulic chamber 3 at the first pressure receiving region A (FIG. 2), a thrust force is produced which tends to move the differential piston 8 toward the downstream side (or left-hand side) as viewed in FIG. 1 of the control apparatus 1. On the other hand, when the second pressure receiving region B (FIG. 2) is applied with a hydraulic pressure in the upstream or second hydraulic chamber 5, a thrust force is produced under which the differential piston 8 is moved toward the upstream side (the right-hand side) of the control apparatus 1. It should be noted that a fluid-tight air chamber 13 is defined between the stationary sleeve-like member 9 and the inner wall of the differential piston 8 at a region located in the upstream chamber 3. Due to such arrangement of the air chamber 13, the effective area of the first pressure receiving region A for producing the thrust force described above is smaller than the effective area of the second pressure receiving region B. More specifically, referring to FIG. 2, the effective area C of the first pressure receiving region A as well as the effective area D of the second pressure receiving region B can be given by the following mathematic expressions:

$$C = \pi/4 \, (a^2 - c^2),$$

and $$D = \pi/4 \, (a^2 - b^2)$$

wherein a represents an outer diameter of the downstream side end of the differential piston 8, b represents an outer diameter of the stationary sleeve-like member 9 and c represents an outer diameter of the fluid-tight air chamber 13.

By virtue of difference between the effective areas C and D of the pressure receiving regions A and B, the thrust force for urging the differential piston 8 toward the upstream side will become greater than the thrust force for urging the piston 8 toward the downstream side, when the hydraulic pressures produced in both the upstream and the downstream chambers 3 and 5 are at the same level. Under such conditions, the differential piston 8 will tend to be displaced toward the upstream side against the force of spring 12 in dependence on the magnitude of difference in the thrust forces exerted to the piston 8 in the opposite directions.

Figure 2:
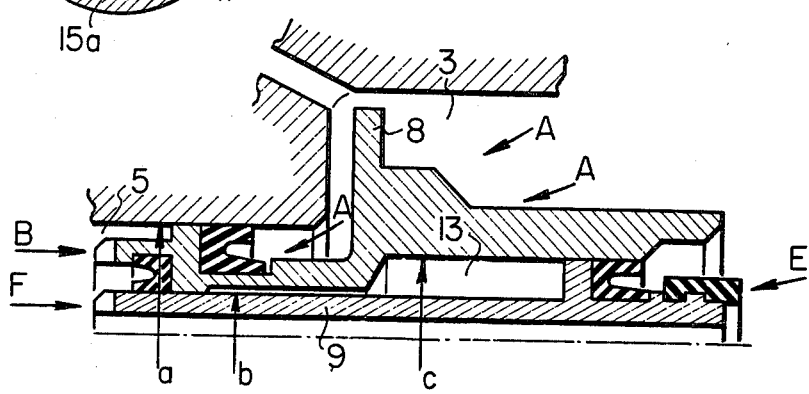
FIG. 2 is a fragmental enlarged view of FIG. 1 showing a portion of a differential piston employed in the control apparatus.

As is clearly shown in FIG. 2, the stationary sleeve-like member 9 has pressure receiving end regions E and F which are exposed in the upstream and downstream chambers 3 and 5, respectively. The effective area of the upstream pressure receiving end region E is selected larger than that of the downstream end region F. Thus, the stationary sleeve-like member 9 is constantly urged toward the downstream side and maintained at the position shown in FIG. 1 during the operation of the control apparatus. In FIG. 1, reference numerals 17, 18 and 19 denote seal members.

Figure 3:
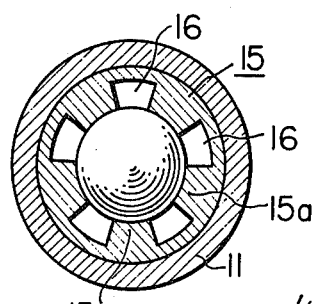
FIG. 3 is a sectional view taken along the line III—III in FIG. 1.

FIG. 3 shows a structure of an annular member 15 snugly mounted within the housing 11. As can be seen from this figure, the annular member 15 has a plurality of radial projections 15a spaced from one another in the circumferential direction and extending radially inwardly. Passages 16 for brake oil are defined between the projections 15a which additionally serve to support rollably the ball valve 7 at the inner ends thereof.

Next, description will be made on the operation of the hydraulic brake pressure control apparatus 1 of the structure described above.

It is first assumed that the motor vehicle is in the unloaded state. When the brake pedal 51 is actuated, the increased hydraulic pressure produced in the master cylinder 50 is transmitted from the outlet port 50b thereof to the brake cylinders 52 and 52' for the front wheels through the conduit $P_2$ and at the same time to the upstream chamber 3 from the outlet port 50a through the conduit $P_1$. The hydraulic pressure in the upstream chamber 3 in turn is transmitted to the downstream chamber 5 through the center bore passage 6 and hence to the brake cylinders 53 and 53' for the rear wheels through the outlet passage 4 and the conduit $P_1$. When the hydraulic pressure is delivered to the individual brake cylinders 52; 52' and 53; 53' in this manner, corresponding braking forces are applied to the associated front and rear wheels.

FIG. 4 graphically illustrates the control performance characteristics of the hydraulic brake pressure control apparatus 1 in comparison with ideal control characteristics. The control performance characteristics of the control apparatus 1 at the time when the motor vehicle is in the unloaded state is represented by a curve X. As can be seen from this characteristic curve X, the hydraulic pressure in the cylinders for the rear wheels will be increased at the same rate as the hydraulic pressure $P_M$ within the master cylinder is increased, so long as the hydraulic pressure $P_M$ in the master cylinder remains at a level lower than a predetermined pressure value $P_{ml}$. Reference should be made to a segment O–V in FIG. 4. When the hydraulic pressure $P_M$ within the master cylinder has attained the predetermined value $P_{ml}$ with deceleration of the vehicle attaining a predetermined value g, the ball valve 7 is caused to be rollingly moved toward the front side of the motor vehicle (to the left-hand side as viewed in FIG. 1) under inertia produced due to the deceleration, thereby to eventually bear on the valve seat 10 to close the center bore passage 6. At this time point, the hydraulic pressure of the predetermined value $P_{ml}$ prevails in both the upstream and downstream chambers 3 and 5 and acts on the first and second pressure receiving regions A and B of the differential piston 8, which is thus displaced against the force of spring 12 toward the upstream side (right-hand side) of the control apparatus for a predetermined distance $S_l$ (FIG. 1) due to the difference in the effective arears between the pressure receiving regions A and B. When the hydraulic pressure $P_M$ within the master cylinder is further increased beyond the predetermined value $P_{ml}$, the increased hydraulic pressure is delivered to the upstream chamber 3, which results in the movement of the differential piston 8 toward the downstream side of the control apparatus 1. Consequently, the hydraulic medium or oil in the downstream chamber 5 is fed under pressure to the cylinders 53 and 53' for the rear wheels, thereby to increase the hydraulic pressure in these cylinders 53 and 53'. In this manner, when the hydraulic pressure $P_M$ within the master cylinder is further increased beyond the predetermined value $P_{ml}$, the hydraulic pressure $P_W$ within the brake cylinders for the rear wheels is increased at a rate smaller than the rate at which the hydraulic pressure $P_M$ within the master cylinder is increased (Reference is to be made to a line segment V-U in FIG. 4.). At the time when the hydraulic pressure $P_M$ within the master cylinder has attained a higher predetermined value $P_{m4}$, the downstream side end of the differential piston 8 will bear against the inner wall of the housing 11, whereby the piston 8 is inhibited from any further displacement toward the downstream side of the control apparatus 1. As a result, even when the hydraulic pressure $P_M$ within the master cylinder is increased beyond the predetermined value $P_{m4}$, the hydraulic pressure $P_W$ in the brake cylinders for the rear wheels will not increase and remain constant. This condition is represented by a horizontal segment of the characteristic curve X in FIG. 4.

It can be see that the characteristic curve X representing the control characteristics of the hydraulic brake pressure control apparatus 1 as described above approximates to an ideal control characteristic curve X' for the motor vehicle in the unloaded state.

It is now assumed that the motor vehicle is in a semi-loaded state. The control characteristics of the control apparatus 1 in such semi-loaded state of the motor vehicle is given by a characteristic curve Y in FIG. 4. In this semi-loaded state, actuation of the brake pedal 51 will cause the hydraulic medium or oil to be supplied to the brake cylinders 52, 52'; 53, 53' for the wheels in a similar manner as the vehicle is in the unloaded state. However, in the semi-loaded state of the motor vehicle, the deceleration of the latter can not yet attain the predetermined value g due to increased weight as compared with the unloaded state, even when the hydraulic pressure $P_{ml}$ in the master cylinder has attained the predetermined value $P_{ml}$. The predetermined value g of deceleration is attained only when the hydraulic pressure within the master cylinder has attained a predetermined value $P_{m2}$. At that time, the ball valve 7 is rollingly displaced to close the communication bore 6. In this manner, so long as the hydraulic pressure $P_M$ within the master cylinder remains lower than the predetermined value $P_{m2}$, the hydraulic pressure $P_W$ in the brake cylinders for the rear wheels is increased at the same rate as the hydraulic pressure $P_M$ in the master cylinder is increased, whereby the same hydraulic pressure as the one in the master cylinder can be assured for the brake cylinders for rear wheels (Reference should be made to a line segment O-W in FIG. 4.). On the other hand, after the hydraulic pressure in the master cylinder has exceeded the predetermined value $P_{m2}$, the differential piston 8 is caused to move toward the downstream side of the control apparatus, as a result of which the hydraulic pressure $P_W$ in the brake cylinders for rear wheels will now be increased at a smaller rate than the rate of increase in the hydraulic pressure $P_M$ within the master cylinder (Refer to a line segment W-T in FIG. 4.). When the hydraulic pressure $P_M$ in the master cylinder is further increased to attain a predetermined value $P_{m5}$, the differential piston 8 will bear against the inner wall of the housing 11 at the downstream side, whereby further movement of the differential piston 8 is inhibited. Thus, even if the hydraulic pressure $P_M$ within the master cylinder is increased beyond the predetermined value $P_{m5}$, the hydraulic pressure $P_W$ in the brake cylinder for the rear wheel will be maintained constant. In this manner, the control performance characteristic of the control apparatus 1 in the semi-loaded state of the vehicle as represented by the curve Y is approximated to the ideal control characteristics represented by a curve Y'. It will be noted that the differential piston 8 has been displaced toward the upstream side for a predetermined distance $S_2$ (FIG. 1) when the hydraulic pressure $P_M$ in the master cylinder has attained the predetermined value or level $P_{m2}$.

The control performance characteristic of the hydraulic brake pressure control apparatus 1 at the time when the motor vehicle is in the full-load state is represented by the characteristic curve Z in FIG. 4. In the full-load state of the vehicle, since the deceleration of the predetermined value g can not yet be attained even when the predetermined hydraulic pressure $P_{m2}$ has been attained in the master cylinder, due to the fact that the weight of the vehicle is more increased as compared with the semi-load state, the ball valve 7 will remain stationary to maintain the communication passage 6 to be opened. Accordingly, increase in the hydraulic pressure within the master cylinder beyond the predetermined value $P_{m2}$ will involve a correspondingly increased displacement of the differential piston 8 in the direction toward the upstream side of the control apparatus 1. Such displacement of the differential piston 8 will attain a predetermined amount S (FIG. 1) before the hydraulic pressure $P_M$ in the master cylinder has been increased to produce the deceletation of the predetermined magnitude g, whereby, the differential piston 8 will bear against the ball valve 7 at the upstream end 8' thereof. Accordingly, when the hydraulic pressure in the master cylinder is further increased to produce the deceleration of the predetermined magnitude g, the ball valve is prevented from being rollingly moved. In this manner, the hydraulic pressure $P_W$ in the brake cylinders for the rear wheels is caused to increase always at the same rate as the hydraulic pressure $P_M$ in the master cylinder. In other words, both the hydraulic pressures $P_M$ and $P_W$ take always identical levels, as represented by the characteristic curve Z.

In the case of the hitherto known apparatus, the increase in the hydraulic pressure of the master cylinder to the level $P_{m3}$ at which the deceleration of magnitude g is produced in the full-load state of the vehicle will cause the ball valve 7 to be displaced thereby to close the communication passage 6. Accordingly, after the hydraulic pressure in the master cylinder has been increased beyond the predetermined level $P_{m3}$, the hydraulic pressure in the brake cylinders for the rear wheels will be increased at a smaller rate than the increase of the hydraulic pressure in the master cylinder. Thus, the control characteristic of the hitherto known control apparatus will be such as represented by the curve Z" in FIG. 4, which is remarkably different from the ideal control characteristic curve Z' in the full-load state of the vehicle. It will be noted that the hydraulic pressure in the brake cylinders for rear wheels is at in appropriately low levels after the hydraulic pressure in the master cylinder has exceeded the predetermined value $P_{m3}$. In contrast, the control characteristic curve Z of the control apparatus 1 according to the invention is advantageously approximated to the ideal control characteristic curve Z' for the full-load state of vehicle.

In FIG. 4, a curve X" represents a control performance characteristic of the control apparatus according to the invention for the unloaded state of vehicle which can be obtained by setting the spring 12 such that the differential piston 8 will not be displaced in the unloaded state of vehicle, while the ball valve 7 is so arranged that it can be moved in response to deceleration of a magnitude slightly greater than the predetermined level g. In this way, the hydraulic brake pressure control apparatus according to the invention can be applied to a variety of motor vehicles by correspondingly setting the force of the spring 12 and by appropriately selecting the deceleration level at which the movement of the ball valve 7 is caused to move.

It will be appreciated from the foregoing description that the hydraulic brake pressure control apparatus according to the invention will assure appropriate brake pressure controls under various load conditions of motor vehicle inclusive of no-load and full-load conditions and thus can be advantageously employed in motor vehicles which undergo remarkable variations in the total weight thereof.

The invention has been described by referring to an embodiment illustrated in the drawings, only by way of example. However, the invention is never restricted to such embodiment. Many variations and modifications thereof will readily occur for those skilled in the art without departing from the scope of the invention.

I claim:

1. In an apparatus for controlling hydraulic pressure delivered to hydraulic brake cylinders for rear wheels of a motor vehicle comprising:
    a housing having a first hydraulic chamber hydraulically communicated with a master brake cylinder and a second hydraulic chamber hydraulically communicated with the hydraulic brake cylinders for the rear wheels;
    a communication passage for communication between said first and second chambers;
    a valve element disposed in said first hydraulic chamber and operable to close said communication passage; and
    a differential piston having first and second pressure receiving regions exposed, respectively, in said first and second hydraulic chambers and adapted to control increase in the hydraulic pressure in said rear wheel brake cylinders in response to increase in the hydraulic pressure within said master cylinder after said communication passage has been closed by said valve element;
    the improvement wherein said differential piston is disposed in series with said valve element and is displaceable in the direction toward said first hydraulic chamber to bear against said valve element thereby to prevent said valve element from closing said communication passage in dependence on load states of said motor vehicle, said first pressure receiving region of said differential piston being exposed in said first hydraulic chamber and having a smaller effective area than said second pressure receiving region exposed in said second hydraulic chamber so that said differential piston tends to move in the direction toward said first hydraulic chamber when said first and second fluid chambers are communicated with each other through said communication passage, spring means being disposed in said housing for resiliently urging said differential piston in the direction toward said second hydraulic chamber.

2. An apparatus as set forth in claim 1, wherein said communication passage is constituted by a center bore formed in a sleeve member on which said differential piston is slidably mounted in a fluid-tight manner, and wherein said sleeve member is provided with a valve seat for said valve element at one end positioned in said first chamber.

3. An apparatus as set forth in claim 1, wherein said apparatus is installed on said motor vehicle in such orientation that said first chamber is located at the rear side of said vehicle and extends with a predetermined angle relative to horizontal axis of said motor vehicle.

4. An apparatus as set forth in claim 1 wherein a fluid-tight air chamber is defined between said differential piston and a sleeve member on which said differential piston is slidably mounted in a fluid-tight manner so that a difference in effective area between said pressure receiving regions is provided.

5. The apparatus as claimed in claim 4 wherein said communication passage is constituted by a center bore formed in said sleeve member on which said differential piston is slidably mounted in a fluid-tight manner, and wherein said sleeve member is provided with a valve seat for said valve element at one end positioned in said frist chamber and wherein said valve element is of a spherical configuration and adapted to be rollingly movable to close said communication passage under inertia in response to a preselected magnitude of deceleration of said motor vehicle.

6. In an apparatus for controlling hydraulic pressure delivered to hydraulic brake cylinders for rear wheels of a motor vehicle comprising:
    a housing having a first hydraulic chamber hydraulically communicated with a master brake cylinder and a second hydraulic chamber hydraulically communicated with the hydraulic brake cylinders for the rear wheels;
    a communication passage for communication between said first and second chambers;
    a valve element disposed in said first hydraulic chamber and operable to close said communication passage; and
    a differential piston having first and second pressure receiving regions exposed, respectively, in said first and second hydraulic chambers and adapted to control increase in the hydraulic pressure in said rear wheel brake cylinders in response to increase in the hydraulic pressure within said master cylinder after said communication passage has been closed by said valve element;
    the improvement wherein said differential piston is disposed in series with said valve element and is displaceable in the direction toward said first hydraulic chamber to bear against said valve element thereby to prevent said valve element from closing said communication passage in dependence on load states of said motor vehicle, and wherein said communication passage is constituted by a center bore formed in a sleeve member on which said differential piston is slidably mounted in a fluid-tight manner, and wherein said sleeve member is provided with a valve seat for said valve element at one end positioned in said first chamber.

* * * * *